(12) United States Patent
Gayrard

(10) Patent No.: US 6,292,546 B1
(45) Date of Patent: Sep. 18, 2001

(54) MODEM INCLUDING A DEVICE FOR DETECTING THE BUSY STATE OF A TELEPHONE LINE

(75) Inventor: Didier Gayrard, Acigné (FR)

(73) Assignee: Thomson Licensing, S.A., Boulogne (FR)

( * ) Notice: Subject to any disclaimer, the term of this patent is extended or adjusted under 35 U.S.C. 154(b) by 0 days.

(21) Appl. No.: 09/290,624

(22) Filed: Apr. 13, 1999

(30) Foreign Application Priority Data

Apr. 17, 1998 (FR) .................................................. 98 04848

(51) Int. Cl.$^7$ .................................................. H04M 11/00
(52) U.S. Cl. ......................................... 379/93.09; 379/377
(58) Field of Search .......................... 379/106.8, 93.09, 379/93.11, 100.15, 100.16, 377, 381, 387, 93.28, 93.32

(56) References Cited

U.S. PATENT DOCUMENTS

| | | | |
|---|---|---|---|
| 4,958,371 | 9/1990 | Damoci et al. | 379/377 |
| 5,140,631 | 8/1992 | Stahl | 379/377 |
| 5,422,939 | 6/1995 | Kramer et al. | 379/107 |
| 5,506,891 | * 4/1996 | Brown | 379/377 |
| 6,134,321 | * 10/2000 | Pitsch | 379/106.08 |

FOREIGN PATENT DOCUMENTS

WO97/23985   7/1997 (WO) .............................. H04M/1/00

OTHER PUBLICATIONS

Copy of the French Search Report citing the above-listed references (AA,AB,AC, AM).

* cited by examiner

*Primary Examiner*—Stella Woo
(74) *Attorney, Agent, or Firm*—Joseph S. Tripoli; Joseph J. Laks; Joseph J.. Kolodka

(57) ABSTRACT

The invention relates to a modem intended to be connected to a telephone line comprising a device for detecting the busy state, or the acquisition, of a telephone line. The detector includes a means sensitive to the energy supplied by the modem on its input/output (34) which is connected to the telephone line (38). The detector, which supplies a signal preventing the line being acquired if the line is already busy with another appliance, needs no electrical separation between the line and the modem.

11 Claims, 4 Drawing Sheets

MODEM INCLUDING A DEVICE FOR DETECTING THE BUSY STATE OF A TELEPHONE LINE

FIELD OF THE INVENTION

The invention relates to a device for detecting the busy state or the acquisition of a telephone line on which a modem is connected. It also relates to a modem equipped with such a detection device.

BACKGROUND OF THE INVENTION

A modem is a device for sending and receiving data, generally digital data, travelling via telephone lines.

For sending or receiving data, it is usual to use telephone lines which are used in addition for other uses such as normal telephone communications. This is the case, in particular, for television decoders, such as those using the digital video transmission by satellite standard "DVBS".

These decoders can be linked automatically, via the modem, to a programme supplier without the user of the telephone line being informed at the moment of the communication.

In general, in order not to disturb the usual use of the telephone line, the modem should be such that it gives priority to the telephone communications, that is to say that, if the line is busy, the modem should not attempt the connection and, if appropriate, it should disconnect itself if the user seeks to use the line.

The modem should thus have available a device for detecting the line acquisition or the busy state of the telephone line.

For this detection, it is known to arrange a detector of the variation in current or voltage on the line linked to the modem. However, the variations in current or voltage caused by a telephone handset acquiring the line are often small and therefore difficult to detect. Moreover, the signal detected has to be applied to the modem via a galvanic separator such as an optical coupler if the telephone line conductors should never be earthed, although such a condition is not necessarily imposed on the modem. Hence, the known detection is complex and expensive.

SUMMARY OF THE INVENTION

The invention remedies these drawbacks.

It is characterized in that the device for detecting the busy state or the acquisition of the telephone line includes a means for comparing the energy received on the input of the modem connected to the said telephone line with a reference derived from the energy sent by the modem onto the telephone line.

In other words, in contrast to the known detection devices which analyse the signal originating from the telephone line, the invention analyses the signal generated within the modem. It results from the observation that, at the output of the modem, the impedance of the telephone line which is connected to it has a noticeable influence on the energy of the LF signal supplied by the modem.

Studies have shown that a difference of three decibels theoretically exists on the LF signal at the input/output of the modem between the case where the line connected is busy and the case where the line is not busy.

Analysis of the LF signal at the input/output of the modem does not necessarily dictate the use of a probe. It can be carried out by a program installed in a processor generally present in the modem or in any associated decoder.

BRIEF DESCRIPTION OF THE DRAWINGS

Other characteristics and advantages of the invention will emerge with a description of some of its embodiments, the description being given by referring to the attached drawings, in which.

DETAILED DESCRIPTION OF PREFERRED EMBODIMENTS

Figure 1:
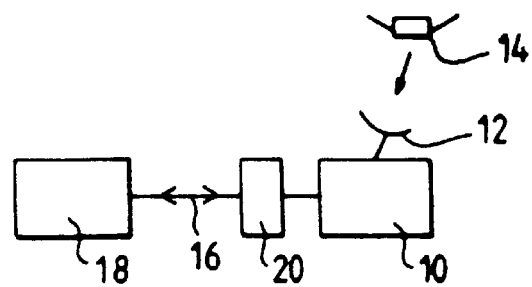
FIG. 1 is a diagram showing a use of a modem according to the invention.

In FIG. 1, a television decoder 10 downloading system has been represented.

For reception, the decoder receives the signals via an antenna 12 picking up the transmission supplied by a satellite 14.

The reception of television transmissions, or of other data supplied by the satellite 14, is subject to authorization which is communicated via a telephone line 16. This telephone line 16 provides interactivity between the programmes received and the user; the line puts a centre 18 in contact with the decoder 10 via a modem 20.

The link between the decoder 10 and the authorization centre 18 is formed in both directions. The decoder 10 can automatically request a link with the centre 18, for example in order to request a particular program, and, conversely, the centre 18 can automatically send information to the decoder 10, in order to give a reception authorization, for example.

Given that, in general, the telephone line 16 is used at the same time for other applications, such as the usual telephone communications or faxes, it is necessary for the automatic communication between the centre 18 and the decoder 10 not to disturb the operation of the subscriber's telephone handsets or other appliance. To this end, a detector of the busy state or the acquisition of the telephone line is provided, as is a means for breaking off the communication between the decoder 10 and the centre 18 when another use of the line 16 is requested, or the decoder 10 is prevented from acquiring or requesting the line when the line is busy.

The invention relates to a means for detecting the busy state or acquisition of a line by the modem 20.

Figure 2:
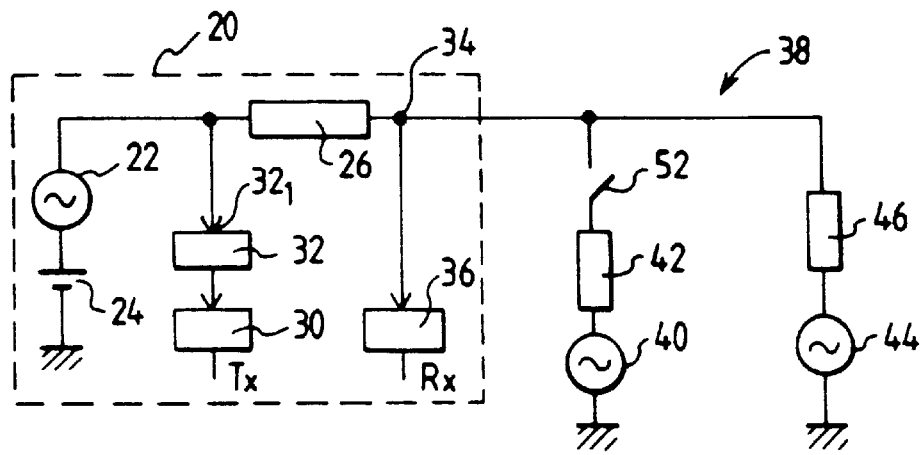
FIG. 2 is a diagram of a modem in accordance with the invention.

As represented in the diagram of FIG. 2, the modem 20 includes an LF generator 22, a DC current source 24 which, in this example, has a voltage of 2.5 V. The negative terminal of this source 24 is connected to earth.

The terminal of the low-frequency generator 22 which is opposite the one connected to the source 24 is linked, on the one hand, to a load or transfer impedance 26, of value $Z_m$ and, on the other hand, to a probe 30 via a divider element 32. The probe 30 is intended to measure the level of the LF signal produced on sending by the modem 20. This signal is, conventionally, denoted $T_x$.

The input/output 34 (called "input" or "output" below) of the modem 20 is connected to the terminal of the impedance 26 which is opposite the generator 22. The voltage at this input/output, that is to say the potential difference (produced by the generator 22) between the terminal 34 and earth is detected by a probe 36. At the terminals of the probe 36 appears a signal $R_x$ which is a function of the impedance of the circuits 38 connected to the modem.

These circuits 38 comprise, on the one hand, one (or more) subscriber's telephone generator(s) 40 which exhibit(s) an impedance 42 of value $Z_t$ and, on the other hand, the LF generator of the telephone line 44 exhibiting an impedance 46 of value $Z_1$.

The telephone instrument, of impedance $Z_t$, is linked to the line 50 via a switch 52. This switch 52 is open when the subscriber is not using his line and is closed when he is using his telephone line.

The comparison between the signals supplied by the probes 30 and 36 makes it possible to determine reliably—as explained below—whether the line is free or busy with an appliance other than the modem, that is to say whether the switch 52 is open or closed, whatever the type of line.

If U is the designation given to the signal level supplied by the generator 22 which is applied to the input 32, of the divider element 32, the signal $R_x$ detected by the probe 36 when the switch 52 is open has a value of:

$$R_x = \frac{U \cdot |Z_1|}{|Z_1 + Z_m|} = U \cdot r_1 \quad (1)$$

When the switch 52 is closed, the signal $R_x$ has a value of:

$$R_x = U \cdot \frac{1}{1 + |Z_m| \cdot \frac{|Z_1 + Z_t|}{|Z_1 \cdot Z_t|}} = U \cdot r_2 \quad (2)$$

If it is assumed that the three impedances have the same value, for example 600Ω, that is to say:

$Z_1 = Z_t = Z_m = 600\Omega$, it is noted that the ratio $r_1$ has a value of 0.5 and the ratio $r_2$ has a value of 0.33 (one third). Hence, the signal $R_x$, when the line is busy (switch 52 closed), exhibits a value which is significantly lower than its value when the line is free.

The measurements on the probes 30 and 36 are preferably made by integration over a relatively lengthy period.

The division factor r of the divider element 32 is chosen in such a way that the signal $T_x$ delivered by the probe 30 is always higher than the signal $R_x$ supplied by the probe 36 when the switch 52 is closed. Moreover, this factor r should be such that the signal $T_x$ is always lower than the signal $R_x$ when the switch 52 is open.

The factor r should thus lie between $r_2$ and $r_1$.

Given that the value $Z_m$ of the impedance 26 is fixed for a given modem, the factor r should be chosen in such a way as to take account of all the possible values of $Z_1$ and $Z_t$, that is to say of the known dispersions on these values.

It was said above that the impedance of the telephone instrument 42 exhibited a value of 600Ω. It has been noted that the precision on this value is generally ±50Ω.

The values $Z_1$ of line impedance 46 depend, on the one hand, on the length of the line, and, on the other hand, on the signal supplied by the modem, and thus on the modulation, since the impedance depends on the frequency.

The average values of line impedances for lengths of 1, 2, 3, 4 and 5 kilometres and for various types of modulation as indicated in the first column are given in Table 1 below.

TABLE 1

| Modulation/ average impedance | L = 1 km | L = 2 km | L = 3 km | L = 4 km | L = 5 km | Dispersion, ohms and % |
|---|---|---|---|---|---|---|
| FSK (V21) | 670 Ω | 680 Ω | 660 Ω | 620 Ω | 580 Ω | 100 Ω (15%) |
| FSK (V23) | 680 Ω | 720 Ω | 730 Ω | 740 Ω | 745 Ω | 65 Ω (9%) |
| QAM16 (V22bis) or QAM4 (V22) | 655 Ω | 636 Ω | 590 Ω | 540 Ω | 500 Ω | 155 Ω (26%) |
| QAM16 (V22bis) sent portion only | 680 Ω | 710 Ω | 700 Ω | 670 Ω | 630 Ω | 80 Ω (11%) |
| V34, spectrum reduced to 1 kHz - 400 Hz PB | 685 Ω | 735 Ω | 750 Ω | 735 Ω | 710 Ω | 65 Ω (9%) |
| V34 (QAMx) total spectrum | 650 Ω | 620 Ω | 590 Ω | 555 Ω | 530 Ω | 120 Ω (20%) |

The last column shows that the dispersion in % on the line impedances is 26% at most.

With these dispersions, it is possible to calculate the ratios $r_1$ and $r_2$ given above and their dispersion and thus to evaluate the possibility of discriminating between a signal $R_x$ at the input of the modem 20 when the switch 52 is open and a signal $R_x$ when the switch 52 is closed.

These evaluations of ratios $r_1$ and $r_2$ are summarized in Table 2 below:

TABLE 2

| Modulation | $Z_1$ min | $Z_1$ max | $r_1$ max | $r_1$ min | $r_2$ max | $r_2$ min | Dmax (dB) | Dmin (dB) |
|---|---|---|---|---|---|---|---|---|
| V21 | 580 | 680 | 0.53 | 0.49 | 0.35 | 0.31 | 4.4 | 2.5 |
| V23 | 720 | 745 | 0.55 | 0.54 | 0.36 | 0.34 | 4.2 | 3.4 |
| V22bis | 500 | 655 | 0.52 | 0.45 | 0.35 | 0.30 | 4.7 | 2.2 |
| V22bis reduced spectrum | 630 | 710 | 0.54 | 0.51 | 0.36 | 0.32 | 4.3 | 3 |
| V34 | 530 | 650 | 0.52 | 0.46 | 0.35 | 0.31 | 4.5 | 2.5 |
| V34 reduced spectrum | 685 | 750 | 0.55 | 0.53 | 0.36 | 0.33 | 4.3 | 3.2 |

In this Table, the suffix "min" or "max" means minimum value or maximum value for the parameter to which it is allocated and D, in decibels, is the ratio existing between, on the one hand, the level of the signal delivered by the probe 36 when the switch 52 is open and, on the other hand, the level of this signal when the switch 52 is closed.

Hence it is seen that the difference is a minimum of 2.2 dB, which is sufficient for carrying out easily measurable discrimination.

Moreover, it is possible to enhance this discrimination, particularly by reducing the analysis spectrum. This is because, if the analysis spectrum, that is to say the spectrum over which the signal $R_x$ is measured, is matched to the data signal originating from the modem present on the line, the dispersions on the average line impedances are reduced and the ratio D may exhibit a much higher minimum value. In Table 1, it is thus seen that, in the case of a V22bis modulation, if the spectrum is reduced to the sent part of the signal, the dispersion on the impedances is 11%, whereas it is 26% for the whole of the spectrum. In the case of V34 modulation, if the measurement is taken at 1 kHz with a pass band of 400 Hz, the dispersion on the line impedances is 9% whereas it is 20% if the measurements are taken for the whole spectrum.

As Table 2 shows, these data are conveyed by the observation that, in the case of V22bis modulation for a total spectrum, the ratio D has a minimum value of 2.2 dB whereas, with a reduced spectrum as indicated above, the minimum value is 3 dB. In a similar way in the case of V34 modulation, the minimum value of D goes from 2.5 dB for the total spectrum to 3.2 dB for a reduced spectrum.

The reduction in spectrum is, obviously, achieved by filtering. This filtering is carried out, for example, by programming the data processor located in the modem or the decoder.

In one embodiment of the invention, the quality of the detection is further enhanced by making the division factor 32 depend on a prior measurement of the ratio $r_1$ which is made, for example, each time the modem 20 is connected. As the connection is made only when the switch 52 is open, the ratio of the power collected on the probe 36 ($R_x$ signal) to the total power of the modem (power known by construction), supplies the ratio $r_1$:

$$r_1 = \frac{Z_1}{Z_1 + Z_m}$$

From this ratio the value of $Z_1$ is deduced, $Z_m$ being known by construction. The only unknown remains $Z_t$; the dispersions allowed on $Z_t$ mean that $r_2$ varies typically from 0.31 to 0.35, which restricts the variations in D from 3.1 to 4. This leads to better discrimination.

Operation of the detection in the case in which the modem is of the digital type with a microprocessor (not shown) will now be described in connection with FIGS. 3 and 4. In this case, detection is carried out essentially by virtue of a calculation. This calculation is based on the following formula:

$$F^2_{rms} = \frac{1}{T}\sum_0^T samp\, value^2(nTs)$$

In this formula, $F^2_{rms}$ is the square of the rms value of the signal sampled over a period Ts.

The signal $F^2_{rms}$ is the image of the average power of the signal on the probe 36.

The relationship above is used to carry out the measurement of the power, by iteration, using the following formula as a basis:

$$y(n) = \frac{y(n-1)\cdot \frac{n\cdot Ts}{Td} + x^2(n)}{n\cdot \frac{Ts}{Td} + 1}$$

In this formula, y(n) is the power integrated at stage n, x(n) is the signal $R_x$ at stage n, Td is a multiple of the sampling period and thus corresponds to a measurement window.

Every T seconds, the value y(n) is stored in a variable $P_{av}$ (average power), T having the value of:

T=N.Ts.

Figure 3:
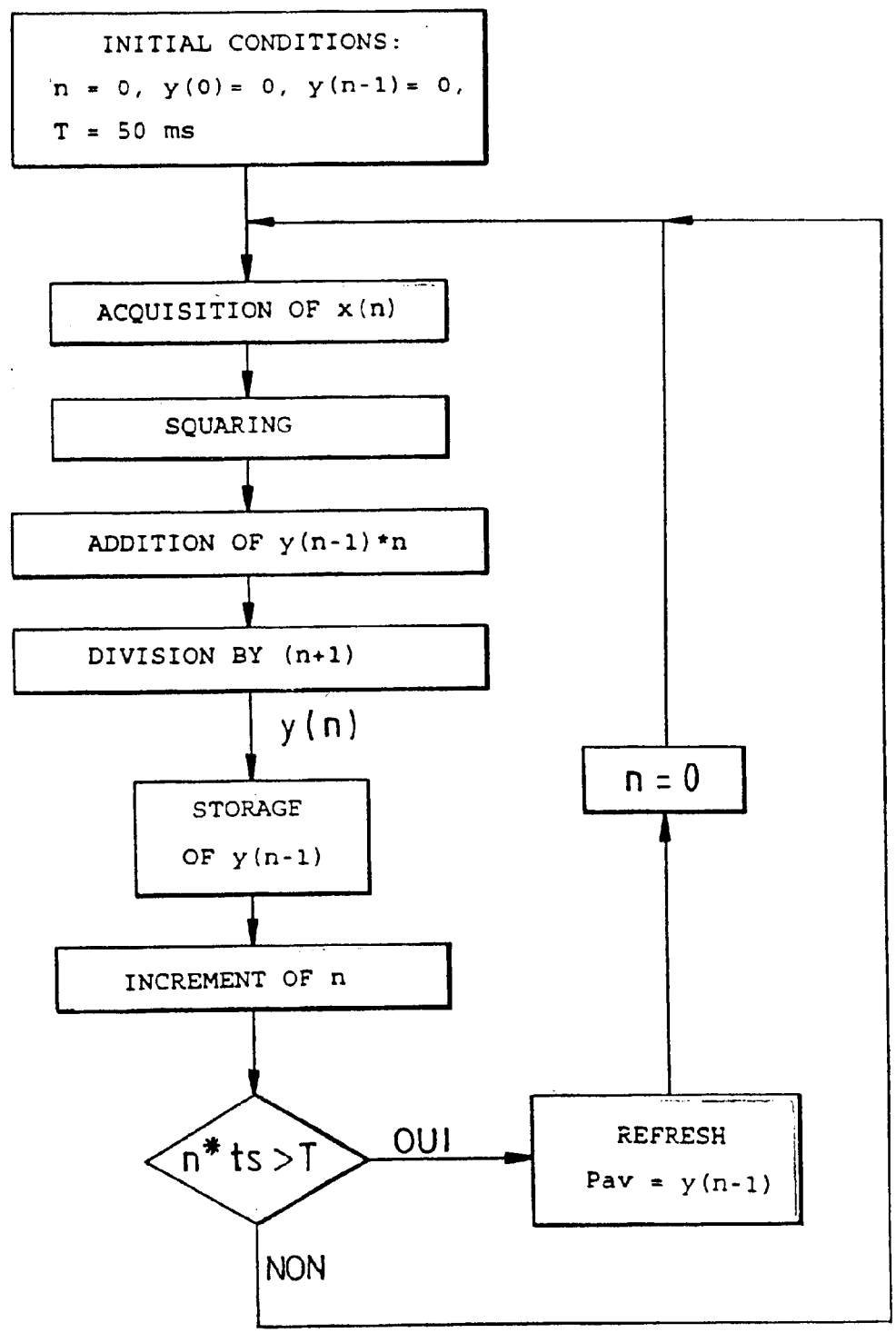
FIG. 3 is a diagram, in block form, showing a detection algorithm for the modem according to the invention.
Figure 4:
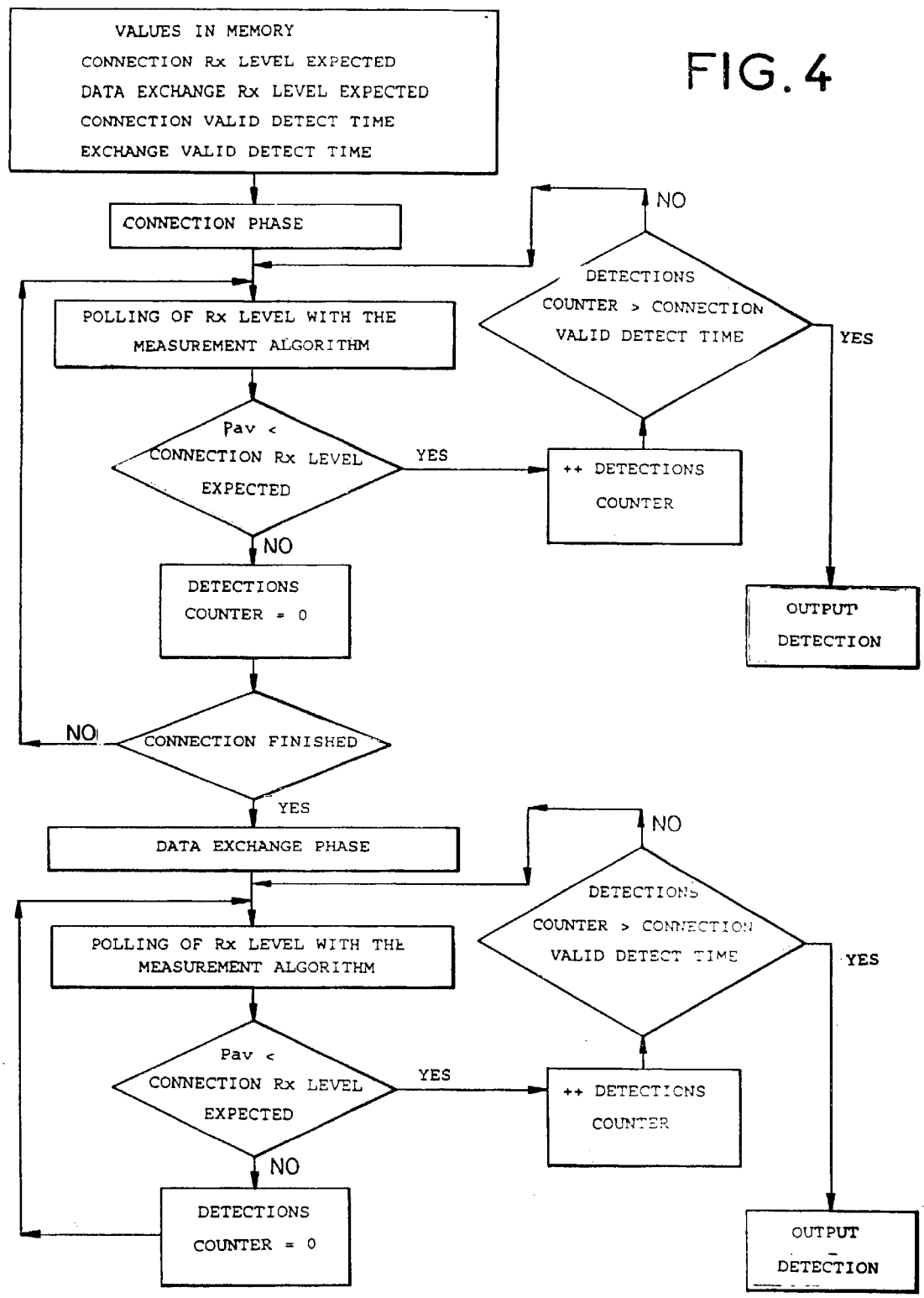
FIG. 4 is also a diagram in block form, showing another algorithm used by the modem according to the invention.

FIG. 3 is a flow chart (forming part of the description) representing the various stages of the calculation corresponding to the equation above.

In one embodiment, with modulation of V22bis type, the sampling period Ts has the value of:

$$Ts = \frac{1}{7200} = 0.14\, ms,$$

The variable $P_{av}$ is refreshed every T=50 ms, ie N=360. If, out of m samples, only one single sample is considered, that is to say if only N/m samples are considered (this is a case of decimation), the error which results therefrom is proportional to m. However, the time for calculating y(n) is reduced in proportion. It is observed, however, that between m=5 and m=1, the difference is less than 0.1 dB.

The result of the measurement taken by the algorithm described above should be validated over sufficient time so as not to take account of short-duration breaks and so as not to detect unhooking of instruments (closure of the switch 52) over very short durations. The validation is carried out according to the flowchart represented in FIG. 4, which forms an integral part of the present description.

In this flow chart, "Connection $R_x$ Level Expected" means the level of $R_x$ which is expected during the connection, "Data Exchange $R_x$ Level Expected" means the level of $R_x$ which is expected during the data exchange phase, "Connection Valid Detect Time" means the validation time during the connection, and "Exchange Valid Detect Time" means the validation time in the course of data exchange.

The validation times indicated above take the following values: 1 to 2 seconds for data exchange and a few hundreds of milliseconds for the connection attempt.

Some modems have terminals making it possible to gain access to variables such as the average power at the input to the modem or the variable gain of a power amplifier with variable gain which determines the level of the input signal. These terminals can be used for the detection, and particularly for calculating the ratios $r_1$ and $r_2$ and/or calculating the impedances $Z_1$ and $Z_r$.

For example, the modems using Rockwell components with references RC 2123 DPL, RC 2324 DPL, RC 144, RCV 144, RC 288, RCV 288, RC 56D and RC 336 D have outputs delivering the "average power" and "variable gain" variables.

Figure 5:
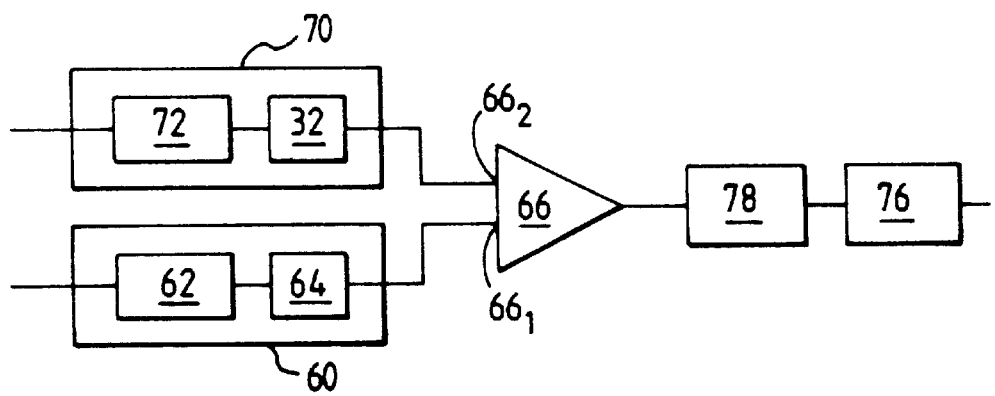
FIG. 5 is a diagram of a detection device according to one variant.

An embodiment of a detector of analogue type will now be described in connection with FIGS. 5 to 7.

The signal $R_x$ originating from the probe 36 is applied to the input of an amplifier circuit 60 which comprises, on the one hand, a peak detector 62 and, on the other hand, an offset device 64 supplying a reference voltage. The output of the circuit 60 is connected to the first input $66_1$ of a comparator 66, the second input $66_2$ of which is linked to the output of a circuit 70 the input of which receives the signal originating from the generator 22. This circuit 70 also includes a peak detector 72 and the divider element 32.

The output of the comparator 66 is linked to one control input of a line-acquisition circuit 76 via a time delay circuit 78 for validating the minimum comparison time.

The reference voltage fixed by the device 64 makes it possible, in the absence of detected energy, for there to be no erratic triggering of a detection.

In one embodiment (not shown), filters are arranged at the inputs of the devices 60 and 70 so as to let through only a limited band of frequencies, for example the sending band of V22bis modulation.

This arrangement makes it possible to limit the dispersion on the impedance $Z_1$ as explained above.

Figure 6:
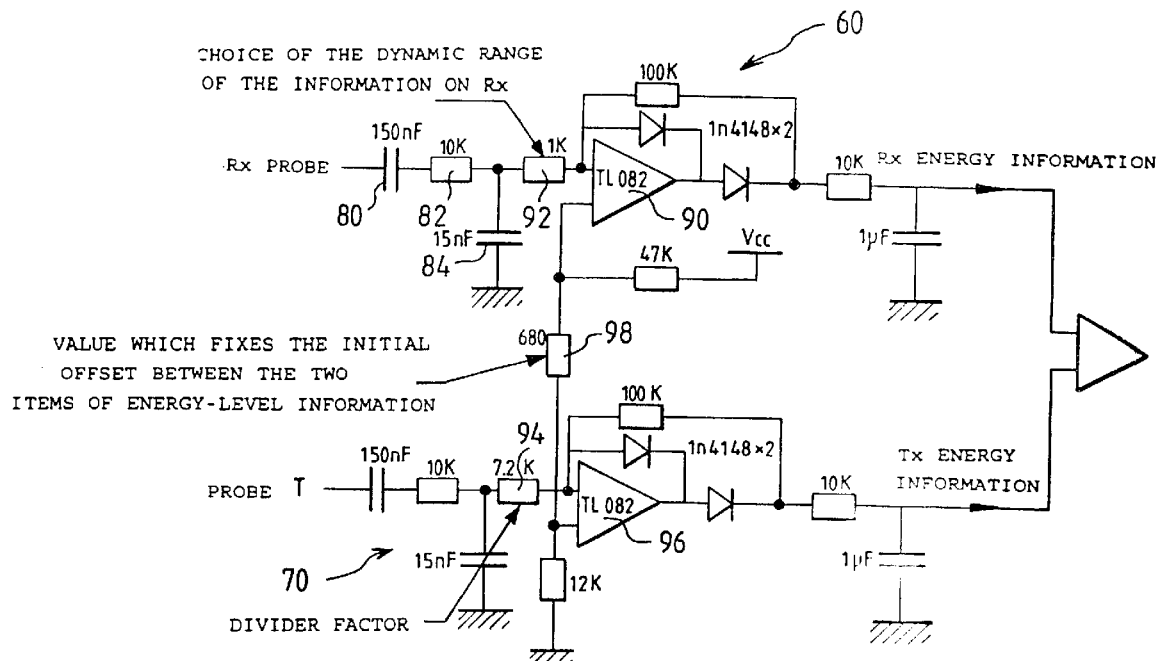
FIG. 6 is a diagram of one embodiment of the detector represented in FIG. 5.

An embodiment of the devices 60 and 70 is represented in FIG. 6.

In this embodiment there is provision, as indicated above, for a bandpass filter. For example, for the circuit 60, a capacitor 80 and a resistor 82 in series are provided, as well as a shunt capacitor 84.

The peak detectors are implemented using operational amplifiers 90.

At the input of the operational amplifier 90, a resistor 92 is provided, with a value chosen as a function of the dynamic range sought on the signal R.

In the circuit 70, the divider element includes a resistor 94 which is located at the input of the corresponding operational amplifier 96.

The two operational amplifiers 90 and 96 are linked via a resistor 98 the value of which fixes the initial offset between the two items of energy level information. This offset makes it possible to differentiate the AC signal information from the DC signal information so as to discard the voltage originating from the generator 24 (FIG. 2).

Figure 7:
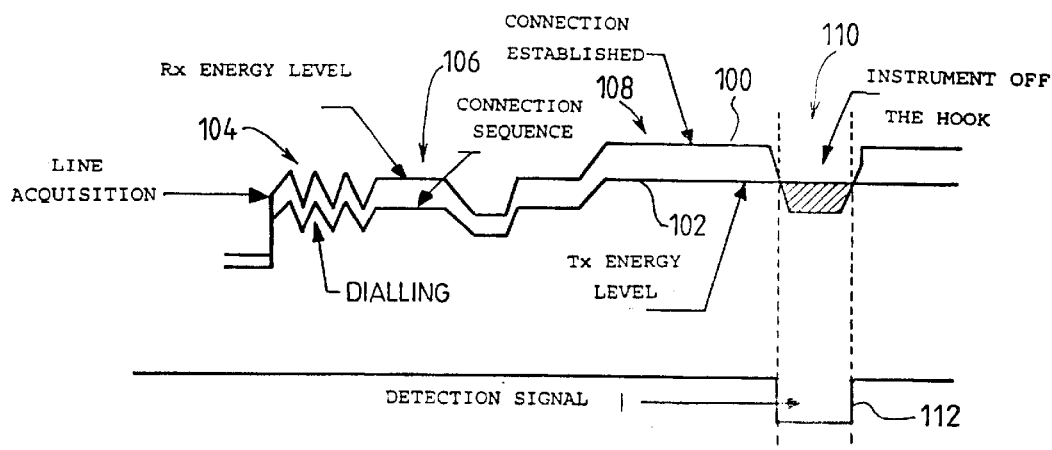
FIG. 7 is a diagram showing a detection signal in the case of the embodiment represented in FIG. 5 or 6.

FIG. 7 is a diagram which represents the energy levels of the $R_x$ and $T_x$ signals during establishment of communication and line acquisition by a telephone appliance in parallel with the modem.

The curve 100 represents the $R_x$ signal and the curve 102 represents the $T_x$ signal.

In the course of a first sequence 104, after the line has been acquired by the modem, the latter generates call pulses. This call phase 104 is followed by a connection sequence 106. When the connection is established (sequence 108) the energy levels are noticeably higher than in the course of the connection sequence.

When the telephone instrument in parallel is taken off the hook, the signal $R_x$ (curve 100) falls below the level of the $T_x$ signal (curve 102) as represented by the period 110. Hence, during the period 110, in the course of which the $R_x$ signal is below the $T_x$ signal, a detection pulse 112 is generated.

The invention applies in general to an appliance intended to be connected to a telephone line, particularly when this appliance has lowest priority by comparison with other appliances on the same line.

What is claimed is:

1. Modem intended to be connected to a telephone line comprising a device for detecting the busy state, or the acquisition, of a telephone line, said detecting device including a means for comparing a signal received on the input of the modem connected to the said telephone line with a reference derived from a signal sent by the modem onto the telephone line, said reference being supplied by a low-frequency generator of the mode, said generator being linked to the input of the modem via a load impedance, said reference corresponding to aid signal that is upstream of the load impedance, an element dividing said signal upstream of said load impedance, a division factor of the element dividing the signal upstream lies between values $r_1$ and $r_2$, with $r_1$ derived from said reference signal when said telephone line is not being used and $r_2$ derived from said reference signal when said telephone line is being used.

2. Modem according to claim 1, characterized in that the load impedance is of the order of 600Ω.

3. Modem according to claim 1, characterized in that the detector includes a filtering means for limiting the spectrum of the detected signals.

4. Modem according to claim 1, characterized in that it includes a means for determining the average power of the signal supplied on its input/output under the nominal conditions of use of the modem and for storing this power in memory, means being provided to dispense with the dispersions on the line impedances.

5. Modem according to claim 4, characterized in that the measurement of the average power and memory storage are carried out each time the modem is started up.

6. Modem according to claim 1, characterized in that the detection is carried out by measuring the average power, preferably by sampling.

7. Modem according to claim 1, characterized in that the detection is carried out by a measurement of the gain of a variable-gain power amplifier.

8. Modem according to claim 1, characterized in that the detection is carried out continuously both in the course of connecting and in the course of the data exchange phase.

9. Modem according to claim 1, characterized in that it includes a means for disconnecting the modem from the line, or preventing it being connected, when the detector sends out a signal indicating that the line is taken or is requested by an appliance connected in parallel.

10. Modem according to claim 1, characterized in that it includes means so that the modem is connected automatically to the telephone line, this connection being broken off when the detection device sends out a busy signal or a signal that the line has been requested by another appliance.

11. Modem intended to be connected to a telephone line comprising a device for detecting the busy state, or the acquisition, of a telephone line, said detecting device including a means for comparing a signal received on the input of the modem connected to said telephone line with a reference derived from a signal sent by the modem onto the telephone line, said reference being supplied by a low-frequency generator of the modem, said generator being linked to the input of the modem via a load impedance, said reference corresponding to said signal that is upstream of the load impedance; an element dividing said signal upstream of the load impedance, a division factor of said element dividing being between values $r_1$ and $r_2$ such that $$r_1 = \frac{Z_1}{Z_1 + Z_m}, \text{ and}$$

$$r_2 = \frac{1}{1 + Z_m \cdot \frac{Z_1 + Z_t}{Z_1 \cdot Z_t}}$$

$Z_1$ being the value of the impedance of the telephone line to which the modem is linked, $Z_t$ the value of the impedance of the telephone appliance connected in parallel with the modem, and $Z_m$ the value of the load impedance.

* * * * *